United States Patent Office 2,953,494
Patented Sept. 20, 1960

2,953,494

2 - AMINO - 1 - (3,4-METHYLENEDIOXYPHENYL)-PROPANE ISOMERS, ATARACTIC PREPARATION CONTAINING 2-AMINO-1-(3,4-METHYLENEDIOXYPHENYL)-PROPANE AND METHOD OF PRODUCING ATARAXIA

Leonard Cook, Abington, and Edwin J. Fellows, North Hills, Pa., assignors to Smith Kline & French Laboratories, Philadelphia, Pa., a corporation of Pennsylvania No Drawing. Filed July 15, 1957, Ser. No. 671,720

4 Claims. (Cl. 167—65)

This invention relates to novel isomers of 2-amino-1-(3,4-methylenedioxyphenyl)-propane, a medicinal preparation having ataractic activity and to a method of producing ataraxia in mentally disturbed human beings.

Prior to the present invention the important advances in the treatment of mentally deranged have largely been in the excited group of patients through the use of central nervous system depressant compounds commonly referred to as tranquilizers. A large proportion of the population of mental hospitals, however, consists of depressed patients whose conditions generally are either not responsive to tranquilizers or aggravated by the use of these drugs. The need of a safe, effective composition for use in this area has been great.

The preparation in accordance with this invention contains 2 - amino - 1-(3,4-methylenedioxyphenyl) - propane having the following structural formula:

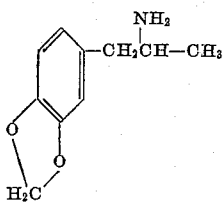

and is very useful in treating various depressive states of psychotic patients due to having an unsual differential in its activity. It, surprisingly for a central nervous stimulant, provides a strong conditioned response block in animals. In the treatment of severely depressed psychotics, it induces ataraxia without any substantial amount of the sympathomimetic action found in closely related compounds such as amphetamine. This preparation has a low incidence of side effects in a dosage range where preparations containing closely related compounds such as 2-amino-1-phenylpropanes produce severe side effects such as jitteriness, excessive stimulation or increased tension.

More specifically, the preparation of this invention is in a dosage unit form and comprises from about 15 mg. to about 150 mg., and preferably from about 25 mg. to about 100 mg., of 2-amino-1-(3,4-methylenedioxyphenyl)-propane or a nontoxic acid addition salt thereof and a pharmaceutical carrier.

The d or l isomer of 2-amino-1-(3,4-methylenedioxyphenyl)-propane or a nontoxic salt thereof can be substituted advantageously for the racemic mixture. Where the term 2-amino-1-(3,4-methylenedioxyphenyl)-propane is employed without any indication as to the d, l or racemic form, it is intended herein and in the claims to cover the individual d and l isomers as well as mixtures thereof.

The active d-isomer is prepared by dissolving the racemic hydrochloride salt in water, neutralizing with inorganic base, for example, sodium hydroxide, and extracting into an organic solvent such as ether or benzene. d-Tartaric acid is added to separate the d-tartrate salt. Recrystallization from alcohol such as isopropanol or aqueous isopropanol gives the pure d-isomer as the d-tartrate with an optical rotation of 29.4° (2% in water). The d-base in hexane has a rotation of 24.6° (1%). If desired, the hydrochloride salt may be regenerated from the active base by treating an ether or hexane solution with anhydrous hydrogen chloride gas. The l-base is similarly prepared.

Preferably the hydrochloride salt of the 2-amino-1-(3,4-methylenedioxyphenyl) - propane is used, however, either the base itself or a nontoxic pharmaceutically acceptable acid addition salt of the base may be used, such as the salt derived from sulfuric, nitric, phosphoric, citric, acetic, lactic, salicylic, tartaric, ethanedisulfonic, sulfamic, acetylsalicyclic, succonic, fumaric, maleic, hydrobromic, benzoic and like acids. The salts are conveniently prepared by reacting the free base with either a stoichiometric amount or an excess of the desired acid in a suitable solvent such as ethanol, ether, ethyl acetate, acetone, water or various combinations of solvents.

The lower part of the dosage range of the 2-amino-1-(3,4-methylenedioxyphenyl)-propane of from about 15 mg. to about 25 mg. is aimed at child medication and at parenteral preparations. For oral use with a solid carrier the preparation for adults would advantageously contain from about 25 mg. to about 75 mg. of the active propane compound. If a sustained release (i.e. having a release over a period of about 12 hours) is used, the above dosage ranges can be tripled.

The pharmaceutical carrier may be, for example, either a solid or a liquid. Exemplary of solid carriers are talc, corn starch, lactose, ethylcellulose, magnesium stearate, agar, pectin, stearic acid, gelatin and acacia. Exemplary of liquid carriers are water, peanut oil, olive oil and sesame oil. Solid carriers are preferred.

A wide variety of pharmaceutical forms can be employed. Thus, if a solid carrier is used, the preparation can be tabletted or placed in a hard gelatin capsule. If a liquid carrier is used, the preparation may be in the form of a soft gelatin capsule or placed in an ampule. The amount of carrier will vary widely but preferably will be from about 25 mg. to about 1 gm.

The method in accordance with this invention comprises administering internally 2-amino-1(3,4-methylenedioxyphenyl)-propane or a nontoxic salt thereof in an amount to produce ataraxia in depressed psychotic patients. The administration may be orally or parenterally preferably employing the above described preparation. In this method it is preferred to administer from about 60 mg. to about 350 mg. and advantageously about 75 mg. to about 320 mg. of 2-amino-1-(3,4-methylenedioxyphenyl)-propane or a salt thereof daily, preferably administering equal doses three or four times daily. In the treatment of children somewhat lower dosages are used depending largely on the age and weight of the child. Such doses may be individually determined by the physician but will ordinarily be about half the adult dosage.

EXAMPLE 1

A solution of 35.8 g. (0.2 mole) of 2-amino-1-(3,4-methylenedioxyphenyl)-propane and 30 g. of d-tartaric acid in 600 ml. of 75% isopropanol is allowed to stand at room temperature after seeding. A thick precipitate separates. After filtration, the solid tartrate is recrystallized several times from isopropanol to white crystals of d-2-amino - 1-(3,4-methylenedioxyphenyl)-propane d-tartrate, M.P. 145–146° C., [α]$^{25}$ and 29.44° (1% H₂O). The free d-base is regenerated and taken into hexane, $$[α]^{25} + 24.6°$$

The free d-base is reconverted to the hydrochloride salt with gaseous hydrogen chloride, M.P. 185–187° C.

The mother filtrate is evaporated to give 22 g. of the 1-2-amino-1-(3,4-methylenedioxyphenyl)-propane d-tartrate, M.P. 125–130° C. After converting a portion to the base in hexane, the specific rotation of this sample is −11.5° C. The remainder of the tartrate is recrystallized from aqueous ethanol to pure white crystals of 1-base d-tartrate, M.P. 129–132° C., [α]$^{25}$ −28.5° (1% H₂O).

EXAMPLE 2

*dl-2-amino-1-(3,4-methylenedioxyphenyl)-propane*

| | Mg. |
|---|---|
| Hydrochloride | 25 |
| Lactose | 230 |
| Starch | 45 |

The above ingredients were thoroughly mixed, granulated using a 10% gelatin solution and compressed into tablets using an admixture of talc-stearic acid as a lubricant.

EXAMPLE 3

*dl-2-amino-1-(3,4-methylenedioxyphenyl)-propane*

| | Mg. |
|---|---|
| Maleate | 75 |
| Lactose | 225 |

The above ingredients were thoroughly mixed, granulated using a 50% sucrose solution and compressed into tablets using an admixture of 7% starch and 1% magnesium stearate based on tablet weight.

EXAMPLE 4

*d-2-amino-1-(3,4-methylenedioxyphenyl)-propane*

| | Mg. |
|---|---|
| Hydrochloride | 50 |
| Lactose | 150 |
| Starch | 50 |

The above ingredients were thoroughly mixed, granulated using a 10% gelatin solution and compressed into scored tablets.

EXAMPLE 5

*dl-2-amino-1-(3,4-methylenedioxyphenyl)-propane*

| | Gm. |
|---|---|
| Hydrochloride | 300.00 |
| Lactose (200 mesh) | 2820.00 |
| Magnesium stearate | 60.00 |

The powders are mixed, screened and filled into #2 hard gelatin capsules (12,000 capsules at 25 mg.).

EXAMPLE 6

*l-2-amino-1-(3,4-methylenedioxyphenyl)-propane*

| | Mg. |
|---|---|
| Sulfate | 75 |
| Peanut oil | 225 |

The ingredients are mixed to a thick slurry and filled into a soft gelatin capsule.

EXAMPLE 7

*dl-2-amino-1-(3,4-methylenedioxyphenyl)-propane*

| | Mg. |
|---|---|
| Hydrochloride | 100 |
| Hydrogenated castor oil | 100 |

The chemical is imbedded in the hydrogenated castor oil by melting the latter, mixing in the chemical and solidifying. After comminuting and screening through a Number 10 screen, the powder is granulated with a small amount of starch to produce sustained release granules.

*dl-2-amino-1-(3,4-methylenedioxyphenyl)-propane*

| | Mg. |
|---|---|
| Hydrochloride | 50 |
| Stearic acid | 15 |
| Talc | 15 |

The above ingredients are mixed and granulated with a gelatin solution, dried, screened and compressed into cylindrical, flat faced tablets. The sustained release granules are added to the die and compressed onto the previously formed tablets.

EXAMPLE 8

*d-2-amino-1-(3,4-methylenedioxyphenyl)-propane*

| | Mg. |
|---|---|
| Hydrochloride | 15 |
| Lactose | 245 |
| Magnesium stearate | 5 |

The powders are mixed, screened and filled into a Number 2 hard gelatin capsule.

EXAMPLE 9

*dl-2-amino-1-(3,4-methylenedioxyphenyl)-propane*

| | Mg. |
|---|---|
| Hydrochloride | 30 |
| Lactose | 225 |
| Starch | 45 |

The ingredients are mixed, granulated and compressed into a scored tablet which may be broken for divided doses if desired.

EXAMPLE 10

*dl-2-amino-1-(3,4-methylenedioxyphenyl)-propane*

| | | |
|---|---|---|
| Hydrochloride | w./v. | 2.0 |
| Sodium chloride | w./v. | 0.375 |
| Water for injection, U.S.P., q.s. ad 100%. | | |

The solid ingredients are dissolved in part of the water and made to 100% volume. The resulting solution is filtered through a Selas filter and filled into ampuls.

What is claimed is:

1. The method of treating depressed psychotics and causing a blocking of conditioned response which comprises internally administering a daily dosage regimen of about 60–350 mg. of a member selected from the group consisting of 2-amino-1-(3,4-methylenedioxyphenyl)-propane and its nontoxic acid addition salts combined with a pharmaceutical carrier.

2. The method of claim 1 in which the administering is orally.

3. The method of treating depressed psychotics and causing a blocking of conditioned response which comprises orally administering a daily dosage regimen of about 75–250 mg. of a member selected from the group consisting of 2-amino-1-(3,4-methylenedioxyphenyl)-propane and its nontoxic acid addition salts combined with a pharmaceutical carrier.

4. The method of treating depressed psychotics and causing a blocking of conditioned response which comprises orally administering a daily dosage regimen of about 60–350 mg. of a member selected from the group consisting of substantially pure d-2-amino-1-(3,4-methylenedioxyphenyl)-propane and its nontoxic acid addition salts combined with a pharmaceutical carrier.

(References on following page)

References Cited in the file of this patent

UNITED STATES PATENTS

| | | |
|---|---|---|
| 1,073,966 | Decker | Sept. 23, 1913 |
| 2,578,696 | Gump | Dec. 18, 1951 |

FOREIGN PATENTS

| | | |
|---|---|---|
| 273,323 | Germany | Apr. 23, 1914 |

OTHER REFERENCES

Beyer: Physiological Reviews, April 1946, p. 190.

Gunn et al.: J. Physiol., vol. 95, p. 485, et seq., 1939.

Karrer: Organic Chem., 2nd ed., 1946, pp. 93–100.

Laurence and Pond: Br. Med. J., Mar. 22, 1958, pp. 700–702.

Hampson et al.: Johns Hopkins Bull., vol. 95, No. 4, 1944, pp. 170–177.

Moyer: J.A.M.A., vol. 165, No. 7, Oct. 19, 1957, p. 780.